United States Patent [19]

Greiner

[11] 4,005,250

[45] Jan. 25, 1977

[54] LOW MOLECULAR WEIGHT COPOLYMERS

[75] Inventor: Richard William Greiner, Newark, Del.

[73] Assignee: Hercules Incorporated, Wilmington, Del.

[22] Filed: Feb. 26, 1975

[21] Appl. No.: 553,373

[52] U.S. Cl. .............................. 526/204; 526/15; 526/271
[51] Int. Cl.² ............... C08F 222/02; C08F 222/06
[58] Field of Search ............... 268/78.5 R, 78.5 T; 526/204, 15, 271

[56] References Cited

UNITED STATES PATENTS

| | | | |
|---|---|---|---|
| 2,744,098 | 5/1956 | Towne | 260/78.5 R |
| 3,268,491 | 8/1966 | Hattori et al. | 260/78.5 R |
| 3,297,654 | 1/1967 | Barr et al. | 260/78.5 R |
| 3,297,657 | 1/1967 | Gray et al. | 260/78.5 R |

*Primary Examiner*—John Kight, III
*Attorney, Agent, or Firm*—Charles L. Board

[57] ABSTRACT

Disclosed are new copolymer mixtures derived from a vinyl ester, maleic anhydride, and a chain transfer agent such as tetrahydrofuran. The salts, such as the sodium salts, of these copolymer mixtures are useful as dispersants for finely divided particles such as kaolin.

7 Claims, No Drawings

LOW MOLECULAR WEIGHT COPOLYMERS

This invention relates to new copolymers of low molecular weight.

In particular, this invention relates to new copolymers of low molecular weight the salts of which are adapted particularly for use as dispersing agents for finely divided clay such as kaolin.

Kaolin is essentially a hydrated aluminum silicate, approximately $H_2Al_2Si_2O_8 \cdot H_2O$ and is known also as China clay; porcelain clay; bolus alba; white bole; argilla; and terra alba.

In order to prepare fluid, high solids suspensions of kaolin in water, it is necessary to add chemical dispersants to the suspensions at some point during their preparation. Dispersants used today include sodium hexametaphosphate and tetrasodium pyrophosphate which are effective, inexpensive dispersants, but they are hydrolytically unstable in the presence of kaolin. The hydrolysis products are not good dispersants and as a result, the viscosity of kaolin suspensions containing polyphosphate dispersants increases during storage. This is a serious disadvantage as the suspensions become difficult to handle as the viscosity increases.

To overcome the problem, supplementary dispersants are usually employed in combination with the above dispersants. Examples of supplementary dispersants are polycarboxylic acid salts such as those available commercially under the proprietary designations Tamol 850 and Dispex N40. These dispersants are effective in stabilizing the viscosity of kaolin suspensions although they lead to higher viscosities than are obtained with the polyphosphates alone.

Copolymers prepared in accordance with this invention have a weight average molecular weight of about 500 to about 6000 and the salts thereof are effective as dispersants for preparing kaolin suspensions having good stability for prolonged periods of time. In addition the salts of the copolymers are useful as dispersants or dispersing agents for other finely divided solids such as the pigments titanium dioxide and calcium carbonate. The preferred salts for use as dispersants are the alkali metal, such as sodium and potassium, salts and the ammonium salts.

The novel copolymers of this invention are derived by free radical-initiated polymerization of vinyl esters of organic acids and maleic anhydride in the presence of at least one chain transfer agent which limits the molecular weight of the copolymer and becomes a part of the copolymer. The resulting copolymer is converted to the corresponding alkali metal or ammonium salt by reaction with the appropriate hydroxide in water. The resulting polymeric polyelectrolytes are mixed with kaolin, or other finely divided solid, in water to yield low viscosity suspensions of high solids content usually of the order of from about 60% to about 72% total solids. The suspensions are stable for prolonged periods of time of at least about two months. The polymeric polyelectrolytes can be used alone or in combination with polyphosphates.

Applicable vinyl esters have the formula

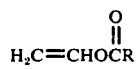

where R is hydrogen or an alkyl of 1 through 3 carbon atoms. Examples of such vinyl esters are vinyl formate; vinyl acetate; vinyl propionate; vinyl butyrate; and vinyl isobutyrate. Vinyl esters of other organic acids such as pentanoic acid; neopentanoic acid; pivalic acid; 2,2,4,4-tetramethyl pentanoic acid; stearic acid and benzoic acid can be employed. Vinyl acetate is the preferred vinyl ester. The mole ratio of vinyl ester to maleic anhydride can vary from 1:2 to 2:1; however, a mole ratio of about 1:1 is preferred.

Chain transfer agents employed in this invention are (1) saturated cyclic ethers containing 5 or 6 atoms in the ring, such, for example, as tetrahydrofuran, dioxane, and tetrahydropyran and (2) aliphatic ethers containing 3 to 8 carbon atoms such, for example, as methylethyl ether, diethyl ether, and dibutyl ether. All the atoms in the ring of the saturated cyclic ethers, other than the oxygen atom(s), will be carbon atoms and the number of carbon atoms will be at least 4. Tetrahydrofuran and dioxane are the preferred ethers.

Polymerization initiators can be any of the well known radical generating species soluble in organic solvents. Examples of such initiators are azobisisobutyronitrile (AIBN); acyl peroxides such as acetyl peroxide and benzoyl peroxide; dialkyl peroxides such as dicumyl peroxide and di-tert-butyl peroxide; hydroperoxides such as cumene hydroperoxide and t-butyl hydroperoxide; alkyl peroxydicarbonates such as diisopropylperoxydicarbonate; and peresters such as t-butyl perbenzoate. Redox systems such as iron (II) salts plus t-butyl hydroperoxide can also be used.

In preparing the copolymers of this invention maleic anhydride, about 1 mole, and polymerization initiator in an amount at least sufficient to initiate the polymerization of maleic anhydride and vinyl ester, usually about 0.005 to about 0.1 mole, are dissolved in about one half to 1 liter of the chain transfer agent. Heat is applied to the resulting solution to activate the polymerization initiator. As is apparent to those skilled in the art, certain redox systems are active at room temperature and do not require heating. If heating is required the solution will be heated usually to a temperature of from about 40° C. to about 100° C., and temperatures of from about 60° C. to about 70° C. will usually be adequate. Temperature (if required) to which the solution is to be heated is well within the skill of the art of addition-type polymerization reactions.

After the solution has reached the desired temperature it is maintained at this temperature and from about 0.5 mole to about 2 moles of vinyl ester is added slowly to the solution to produce the copolymer mixture of this invention. The copolymer mixture is subsequently separated from the reaction mass by removing all volatile materials such as by distilling the volatile materials under reduced pressure.

The following examples illustrate this invention.

EXAMPLE 1

A solution of 49.0 grams (0.5 mole) maleic anhydride in 385 ml. tetrahydrofuran (THF) was placed in a 1-liter flask fitted with stirrer, condenser and thermometer. Azobisisobutyronitrile (1.42 gms., 8.6 mmole) was added to the solution. A solution of 43.0 gm. (0.5 mole) vinyl acetate in 125 ml. THF was prepared. About 10% by weight of this solution was added to the ingredients in the flask and the mixture was heated to 70° C. Ten minutes after the mixture had reached 70° C., the remaining vinyl acetate solution (90%) was added uniformly over 6 hours while the reaction mixture was stirred and maintained at 68°–70° C. All volatile material was then removed under vacuum leaving 91.3 gms. of a low melting copolymer with a weight average molecular weight of 1140 by gel permeation chromatography.

A 5% solution of the sodium salt of this copolymer in water was prepared by dissolving 5.0 gms. of it in 95 gms. water which contained 2.2 g. NaOH. The pH of the final solution was adjusted to 9.0 with 50% aqueous NaOH. This solution was used to prepare suspensions of kaolin as follows.

An amount of this solution, as indicated below, was added to enough water to yield 80 gms. of dilute solution. One hundred twenty gms. of Englehard's H. T. pulverized kaolin was added slowly over 5 minutes to the solution while stirring it vigorously with a Cowles stirrer. The pH was maintained at 9.5 during addition of the kaolin by simultaneously adding 50% NaOH as needed. The suspension was stirred for an additional 15 minutes after all the kaolin had been added and then the viscosity was determined with a Brookfield Model LVT Viscometer using the spindle noted. The results are summarized in Table I.

Table I

| Suspension No. | 1 | 2 | 3 | 4 |
|---|---|---|---|---|
| Wt. of water, grams | 78.8 | 77.6 | 75.2 | 70.4 |
| Wt. of 5% Copolymer solution, grams | 1.20 | 2.41 | 4.80 | 9.63 |
| Wt. of kaolin, grams | 120 | 120 | 120 | 120 |
| Suspension pH | 9.50 | 9.50 | 9.50 | 9.50 |
| Concentration of Copolymer, % of Kaolin | 0.05 | 0.10 | 0.20 | 0.40 |
| Total Solids, % | 60 | 60 | 60 | 60 |
| Brookfield Viscosity Spindle No. | 1 | 1 | 1 | 1 |
| at 6 rpm., cps. | 310 | 132 | 145 | 365 |
| at 12 rpm., cps. | 226 | 114 | 110 | 242 |
| at 30 rpm., cps. | 124 | 71 | 68 | 134 |
| at 60 rpm., cps. | 84 | 51 | 49 | 88 |

EXAMPLE 2

Example 1 was repeated substituting dioxane for THF. The copolymer product weighed 98.1 gms. and had a weight average molecular weight of 5030 by gel permeation chromatography.

Kaolin slips were prepared and viscosities were determined as described in Example 1. The results are summarized in Table II.

Table II

| Suspension No. | 1 | 2 | 3 | 4 |
|---|---|---|---|---|
| Wt. of water, grams | 78.8 | 77.6 | 75.2 | 70.4 |
| Wt. of 5% Copolymer solution, grams | 1.22 | 2.42 | 4.01 | 9.61 |
| Wt. of Kaolin, grams | 120 | 120 | 120 | 120 |
| Suspension pH | 9.50 | 9.50 | 9.50 | 9.50 |
| Concentration of Copolymer, % of Kaolin | 0.05 | 0.10 | 0.2 | 0.4 |
| Total Solids, % | 60 | 60 | 60 | 60 |
| Brookfield Viscosity, cps. Spindle No. | 2 | 2 | 2 | 2 |
| at 6 rpm. | 425 | 140 | 155 | 375 |
| at 12 rpm. | 327 | 95 | 95 | 235 |
| at 30 rpm. | 174 | 61 | 52 | 130 |
| at 50 rpm. | 116 | 52 | 40 | 87 |

EXAMPLE 3

Example 1 was repeated substituting 2.42 gm. benzoyl peroxide for 1.42 g. AIBN. The copolymer product was a pink colored solid, weighing 88.9 g., mol. wt. by osmometry = 500. The product from Example 1 had a mol. wt. by osmometry of 466.

EXAMPLE 4

Example 3 was repeated using one half the quantities but vinyl acetate was omitted. The product was a deep red oil weighing 44 g. (205% of wt. of maleic anhydride charged). The product was found to be the 1:1 maleic anhydride:THF adduct having the structure (I) below, which was found to be present in a small amount in the product from Example 1.

It was evaluated as a pigment dispersant using the techniques described in Example 1. The results are summarized in Table III.

Table III

| Suspension No. | 1 | 2 | 3 |
|---|---|---|---|
| Wt. of water, grams | 77.6 | 75.2 | 70.4 |
| Wt. of 5% Solution of I, grams | 2.41 | 4.80 | 9.62 |
| Wt. of Kaolin, grams | 120 | 120 | 120 |
| Suspension pH | 9.50 | 9.50 | 9.50 |
| Concentration of Copolymer, % of Kaolin | 0.1 | 0.2 | 0.4 |
| Total Solids, % | 60 | 60 | 60 |
| Brookfield Viscosity, cps. Spindle No. | 3 | 3 | 4 |
| at 6 rpm. | 10,000 | 10,200 | 10,700 |
| at 12 rpm. | 6,200 | 6,300 | 4,900 |
| at 30 rpm. | 2,544 | 2,472 | 2,140 |
| at 60 rpm. | 1,450 | 1,357 | 1,145 |

With the exception of Example 3, molecular weights of the copolymers produced in accordance with this invention were determined by gel permeation chromatography.

The data from gel permeation chromatography showed clearly that the products from all preparations were complex. The product from Example 1 made with tetrahydrofuran contained a broad distribution of low molecular weight species. To characterize the copolymers of Example 1, the product was converted to the methyl ester, subjected to preparative scale chromatography and the various molecular weight species were identified by a combination of nuclear magnetic resonance (NMR), mass spectographic and infrared absorption (IR) techniques.

The lowest molecular weight species represented 9.5% of the total weight of the reaction mass. The retention time in vapor phase chromatography and the infrared spectrum of this material were identical to those of an authentic sample of the dimethyl ester of 1:1 tetrahydrofuran:maleic anhydride adduct (I). The NMR spectrum of this fraction showed absorption bands and peak areas which were consistent with those expected for the dimethyl ester of (I).

The second lowest molecular weight species represented 12.6% of the total weight of the reaction mass. Its infrared spectrum was similar to that of the dimethyl ester of (I) except for an additional absorption band at 1225 $cm^{-1}$ which shows the presence of an acetate group. The field ionization mass spectrum of this material showed a major peak at mass 447, which is the molecular weight of the tetramethyl ester of (II). The NMR spectrum of this material showed major peak positions and relative areas consistent with the assignment of the structure of this fraction as the tetramethyl ester of (II).

Several fractions of the main portion of the total reaction mass were also isolated. The infrared spectrum of each fraction was similar to that of the methyl ester of (II) except that the relative intensity of the ether absorption band at 1063 cm$^{-1}$ decreased as the molecular weight of the fractions increased, from about 675 (corresponding to a molecular weight of 490 if the maleic groups, when X is 2 in structure (III), were in anhydride form) to about 6000. Since the structure of (II) is quite positively established from the NMR data, these IR results indicate that these main fractions of the product of Example 1 have the structure (III) where X varies from 2 to about 30.

dispersant changed and passed through a minimum between about 0.1 and 0.2% dispersant based on kaolin.

The effectiveness of the various copolymers can be compared with commercial materials at 0.2% of the weight of kaolin. The data are summarized in Table IV. It is clear from these data that all of the materials included in Table IV were comparable in their efficacy as dispersants for the kaolin clay under the test conditions.

Table IV

COMPARISON OF THE EFFICACY OF COPOLYMERS OF THIS INVENTION WITH CALGON AND TAMOL 850 AS DISPERSANT FOR KAOLIN[1]

| Dispersant | Brookfield Viscosity, cps. at | |
|---|---|---|
| | 6 rpm. | 60 rpm. |
| Calgon (sodium hexametaphosphate) | 75 | 28 |
| Tamol 850 (sodium salt of polymeric carboxylic acid) | 125 | 48 |
| Sodium Salt of Example 1 Copolymer | 155 | 49 |
| Sodium Salt of Example 2 Copolymer | 155 | 39 |

[1]60% solids suspensions, 0.2% dispersant on kaolin, pH 9.5

It is important that the viscosity of pigment dispersions remain stable during storage. Data in Table V show clearly that suspensions containing TSPP as the only dispersant become very thick during storage at 70° C. for 24 hours while suspensions to which Tamol 850, or the salts of copolymers of this invention had been added, changed relatively little under the same conditions.

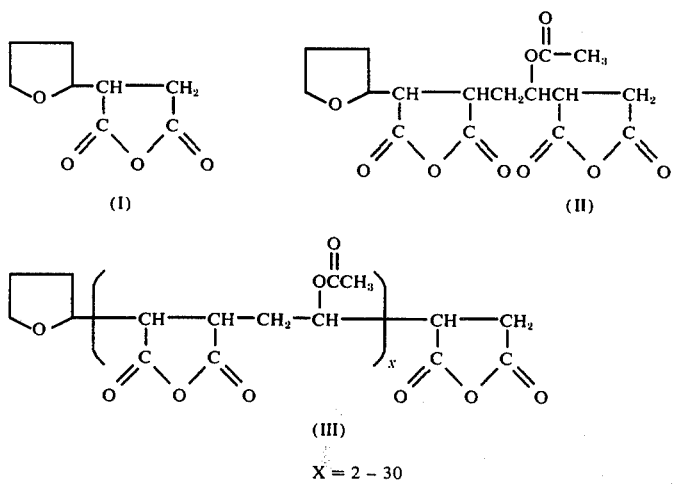

X = 2 - 30

To evaluate the copolymers as pigment dispersants, each was dissolved in aqueous sodium hydroxide, the pH was adjusted to 9.5 and pulverized kaolin (available commercially as Englehard's H.T.) was added until the total solids content was 60%. The amount of copolymer used varied from 0.025% to 0.4% of the weight of kaolin. The viscosity of each suspension was measured using a Brookfield Model LVT Viscometer. The viscosity of the suspensions changed as the concentration of Table V EFFECT OF AGING AT 70° C. ON EFFICACY OF SOME DISPERSANTS IN 70% SOLIDS KAOLIN SUSPENSIONS[1]

| Dispersant | Brookfield Viscosity, cps. at 6 rpm. | |
|---|---|---|
| | Initially | After 24 hours at 70° |
| TSPP | 1080 | 9700 |
| Tamol | 1940 | 1080 |
| Sodium Salt of Example 1 Copolymer | 1900 | 1980 |

[1]70±0.3% solids suspensions, H. T. pulverized kaolin, 0.15% dispersant based on weight of kaolin added, pH 9.0.

It is to be understood that the above description and working examples are illustrative of this invention and not in limitation thereof.

What I claim and desire to protect by Letters Patent is:

1. A copolymer having a weight average molecular weight of from about 500 to about 6000 derived by free radical polymerization of a vinyl ester and maleic anhydride in the presence of a chain transfer agent selected from the group consisting of dioxane and tetrahydrofuran.

2. The copolymer of claim 1 wherein the vinyl ester is vinyl acetate.

3. The copolymer of claim 2 wherein the chain transfer agent is tetrahydrofuran.

4. The copolymer of claim 2 wherein the chain transfer agent is dioxane.

5. An alkali metal or ammonium salt of the copolymer of claim 2.

6. An alkali metal or ammonium salt of the copolymer of claim 3.

7. An alkali metal or ammonium salt of the copolymer of claim 4.

* * * * *